(12) United States Patent
Koch et al.

(10) Patent No.: US 7,410,580 B2
(45) Date of Patent: Aug. 12, 2008

(54) HOLLOW FIBER MODULE

(75) Inventors: Berthold Koch, Neuss (DE); Markus Müller, Bend, OR (US); Herbert Schlensker, Leverkusen (DE)

(73) Assignee: BEKO Technologies GmbH (DE)

( * ) Notice: Subject to any disclaimer, the term of this patent is extended or adjusted under 35 U.S.C. 154(b) by 0 days.

(21) Appl. No.: 10/531,539

(22) PCT Filed: Oct. 9, 2003

(86) PCT No.: PCT/DE03/03374

§ 371 (c)(1),
(2), (4) Date: Apr. 15, 2005

(87) PCT Pub. No.: WO2004/035181

PCT Pub. Date: Apr. 29, 2004

(65) Prior Publication Data

US 2006/0065588 A1    Mar. 30, 2006

(30) Foreign Application Priority Data

Oct. 16, 2002    (DE) .................. 102 48 139
Dec. 18, 2002    (DE) .................. 102 59 661

(51) Int. Cl.
  *B01D 63/02*    (2006.01)
(52) U.S. Cl. .............. 210/321.79; 210/321.74; 210/321.8; 210/321.83; 210/321.88; 210/321.89; 210/443; 210/500.23; 96/8; 96/10
(58) Field of Classification Search ............ 210/312.74, 210/321.79, 321.8, 321.83, 321.88, 321.89, 210/443, 500.23; 96/8, 10
See application file for complete search history.

(56) References Cited

U.S. PATENT DOCUMENTS 3,422,008 A    1/1969    McLain (Continued)

FOREIGN PATENT DOCUMENTS

DE    197 16 752 C 1    6/1998

(Continued)

OTHER PUBLICATIONS

International Search Report for PCT/DE03/03374 mailed Mar. 18, 2004.

*Primary Examiner*—John Kim
(74) *Attorney, Agent, or Firm*—McCarter & English, LLP (57) ABSTRACT

The invention relates to a hollow fiber separation module comprising an inlet (20) for the gas to be dried, an outlet (22) for dried gas, an access element (26) and a discharge element (28) for circulation gas, and a plurality of hollow fibers which respectively extend from the inlet (29) to the outlet (22) and comprise an inner region which communicates with the inlet (20) on one end of each hollow fiber, and with the outlet (22) on the other end of each hollow fiber. The hollow fibers are wound up in a plurality of layers (40, 42, 44) to form a hollow cylindrical winding. Each layer (40, 42, 44) is inwardly defined by an imaginary cylinder (35, 36, 37) and has a number of hollow fibers which are wound onto the cylinder (35, 36, 37) in a helical manner with an alpha angle of inclination, are located at a distance a from each other, and are arranged on the cylinder in a homogeneously distributed manner. A layer (40) differs from an adjacent layer (e.g. 42) in that the fibers of one of the layers all form a plus alpha winding angle, whereas the fibers of the adjacent layers all form a minus alpha winding angle.

16 Claims, 9 Drawing Sheets

U.S. PATENT DOCUMENTS

| | | |
|---|---|---|
| 3,794,468 A | 2/1974 | Leonard |
| 4,252,765 A | 2/1981 | Brumfield |
| 4,451,369 A * | 5/1984 | Sekino et al. ............ 210/321.9 |
| 5,108,464 A * | 4/1992 | Friesen et al. ................... 95/52 |
| 5,160,042 A * | 11/1992 | Bikson et al. ............ 210/321.8 |
| 5,299,749 A | 4/1994 | Thorogood et al. |
| 5,376,334 A * | 12/1994 | Haworth et al. ............... 422/46 |
| 5,702,601 A | 12/1997 | Bikson et al. |
| 5,837,033 A | 11/1998 | Giglia et al. |
| 6,776,820 B2 * | 8/2004 | Bikson et al. .................. 95/52 |

FOREIGN PATENT DOCUMENTS

| | | |
|---|---|---|
| EP | 0 669 158 B1 | 4/1998 |
| GB | 2 047 874 A | 12/1980 |
| WO | WO 02/38247 A1 | 5/2002 |
| WO | WO 02/45822 A1 | 6/2002 |

* cited by examiner

HOLLOW FIBER MODULE

FIELD OF THE INVENTION

The invention relates to a hollow fiber fluid separation module for separating gaseous or liquid fluids having an inlet for an inlet feed flow, an outlet for an exit flow, an access port for a permeate flow, a discharge port for the permeate flow, a module axis and a plurality of hollow fibers, each of said fibers extending from the inlet to the outlet and comprising an interior communicating with the inlet at one end of each hollow fiber and with the outlet at the other end of each hollow fiber. The invention relates more specifically to a hollow fiber drier module to which a gas to be dried is supplied as the inlet feed flow, with the exit flow being dried gas and the permeate flow being formed from a circulation gas. The hollow fluid separation module may also be operated in reverse, with the permeate flow flowing through the interiors of the hollow fibers and with inlet and outlet communicating with the outer surfaces of the hollow fibers.

DESCRIPTION OF THE RELATED ART

A hollow fiber drier module in which the hollow fibers are applied at an incline to the module axis and in a straight line on a porous tube is known from U.S. Pat. No. 3,794,468 A. In a radial plane, the various fibers of a respective one of the layers are offset between 2 and 10° relative to each other. All the fibers of one layer are parallel and intersect the hollow fibers of a neighbouring layer. The various hollow fibers are not wound around the winding body so as to form one at least one winding, they instead extend between the end surfaces of a winding body.

A hollow fiber fluid separation module that may also be utilized as a drier module is known from U.S. Pat. No. 5,837,033 A. The wind angle of the various fibers varies across the axial length.

Hollow fiber drier modules, in which the hollow fibers are helically wound onto a coil carrier with no distance between the hollow fibers, are known from U.S. Pat. No. 5,702,601. Reinforcement filaments, which are also wound onto the coil carrier, are utilized.

Hollow fiber fluid separation modules, more specifically hollow fiber drier modules as they are substantially currently commercialized, have a plurality of parallel hollow fibers between inlet and outlet, with said hollow fibers being arranged more or less evenly and extending in a straight line. In such type drier modules, the local density of the hollow fibers is not constant, more or less dense packings forming locally. Although advantageous conditions are achieved for the gas to be dried, which flows in and out in the axial direction and from the inlet in a substantially straight line toward the outlet, it is difficult to bring the circulation gas to homogeneously flow around all the outer surfaces of the hollow fibers. Further, the circulation gas finds it difficult to spread evenly in a radial direction within the module.

In the hollow fiber fluid separation modules in accordance with the documents mentioned herein above, the modules are constructed from regularly arranged hollow fibers; this allows avoiding locally more or less dense arrangements and the circulation gas to flow more evenly around the outer wall of the hollow fibers. A particularly advantageous configuration of the hollow fiber modules, more specifically of the drier modules, is not achieved, though. In the prior art modules, the hollow fibers substantially extend in the axial direction. It is desired to have modules the length of the various hollow fibers of which is at least 1.5 times, more specifically three times, the axial length. In spite thereof, these modules are to have a sufficiently strong winding, meaning it is to be made certain that the various hollow fibers will not be capable of noticeably becoming displaced relative to one another. In the prior art modules, relative displacement is almost excluded since the hollow fibers are substantially extending between the end faces of the winding bodies and are not wound, as a matter of fact.

In view of the known hollow fiber modules, more specifically of the hollow fiber drier modules, it is the object of the invention to indicate a module that permits to achieve a strong winding, to accommodate a great length of hollow fibers despite of the short overall axial length of the module and to achieve an advantageous ratio between the overall volume of the interior of all of the hollow fibers and the exterior surrounding of the hollow fibers.

SUMMARY OF THE INVENTION

This object is solved by a hollow fiber fluid separation module having an inlet for an inlet feed flow, an outlet for an exit flow, an access for a permeate flow, a discharge port for the permeate flow, a module axis and a plurality of hollow fibers, each of said fibers extending from the inlet to the outlet and comprising an interior communicating with the inlet at one end of each hollow fiber and with the outlet at the other end of each hollow fiber, with the hollow fibers being wound in multiple layers to form a hollow cylindrical coil, each layer being defined on its inner side by an imaginary cylinder and having a number of hollow fibers helically wound on said cylinder with a helix angle .alpha., said fibers being in a clearance relationship a with each other and equally spaced on the cylinder, with one layer differing from a neighbouring layer by the fact that all the fibers of the one layer are inclined at the wind angle plus .alpha. whereas all the fibers of the neighbouring layer are at the wind angle minus .alpha., each fiber being wrapped 360° at least once around the associated cylinder and being laid down during winding with a tensile strain high enough for the fiber to be frictionally held in the best possible manner to the crosswise disposed fibers lying underneath and low enough for the hollow fibers not to have their inner cross section noticeably restricted even though they are deformed at the intersections and for all of the hollow fibers to be applied with the same tensile strain.

In accordance with the invention, the flow around the fiber membrane bundle is optimized on the side of the circulation air, meaning on the side of the permeate. In accordance with the invention, the discrete hollow fiber membranes can be disposed relative to one another in such a manner that the module achieves maximum efficiency in making use of the water vapour permeability of the membrane surface on the inner wall of the hollow fibers and in terms of its capability of absorbing water vapour of the circulation gas. Maximum efficiency is achieved when the permeate flow is optimally guided around the outer walls of the membrane fibers. For this purpose, the flow of the circulation gas must be optimized. This has to occur with reference to the channel geometry and the speed. The invention makes all this possible. It makes it possible to uniformly distribute the circulation gas in a radial direction in any radial plane along the module axis and to achieve good axial through flow. The gas is advantageously circulated around the outer surfaces of the membrane fibers. The module may be optimized for respective purposes of utilization by varying the distance a and also by varying the wind angle .alpha.. Finally, the dimension of the hollow fiber can also be varied, meaning both the inner diameter and the outer diameter, whereby these changes can be made for each layer separately. Preferably, hollow fibers built according to the same design principle are used for one module, though.

The invention more specifically achieves a particularly strong winding of the membrane fibers. Since the membrane fibers are laid down at least once around the imaginary cylinder, there is a risk that the membrane fibers become displaced, for example by mechanical action. As a result, the order of the winding is disturbed. Then, the flow around the fibers is not as uniform as initially achieved by the winding technique. The solution the invention offers here is to wind the hollow fibers with sufficient tensile strain. The tensile strain with which the hollow fibers are laid down during winding is high enough for the wound fibers to be frictionally held on the underlying fibers.

Mechanical loads cannot cause the hollow fiber to become noticeably displaced. On the other side, the tensile strain is low enough for the hollow fibers not to have their free inner cross section noticeably restricted at the intersections between a newly wound fiber and the underlying fibers. At the intersections, the hollow fibers are slightly depressed. The result is a strong winding. A slight registration fit is also obtained.

The indications for the winding tension apply particularly to the hollow fibers from the second layer onward. As contrasted with the first layer, these hollow fibers no longer continuously fit against a cylinder, they now merely rest substantially topically on the hollow fibers of the underlying layer, with respect to which they are arranged crosswise. Accordingly, from the second layer onward, the hollow fibers substantially are only in punctual contact. At the points of contact with the hollow fibers of the underlying layer, which they cross, slight impressions are formed. From the second layer onward, the hollow fibers substantially are merely in punctual contact. The entire effect of the fiber tension is supported by the points of contact with the hollow fibers of the underlying layer, with the hollow fiber slightly deforming. These deformations should not be so important as to noticeably affect the free inner cross section, meaning to form disturbing narrow passages therein.

A strong winding is obtained using the known winding method (see U.S. Pat. No. 5,299,749) in which the fibers are laid down in alternating layers at a positive wind angle ("s"-direction) and at a negative wind angle ("z"-direction). The fiber tension is adjusted so that the load on the hollow fibers at the points of contact with the neighbouring layers is kept within reasonable limits. Thanks to the distance between neighbouring hollow fibers of one layer, helically oriented channels are formed for the permeate flow, more specifically for the circulation gas. They communicate with corresponding helically oriented channels formed in the immediately neighbouring layers. This permits to have an axial e.g., undulating flow. This flow exists in addition to the helical flow. Both flows can be influenced and adjusted, also with respect to each other, by selecting the clearance a between the hollow fibers of one layer, the wind angle and the configuration, for example the geometry, of the hollow fibers. It is particularly important that a radial permeability be generally obtained on the permeate side; this permeability is also adjustable. It is also important because potting is performed at the ends of each module. Free access to every single one of the hollow fibers in the structured winding permits to achieve selective potting, with all of the hollow fibers being sheathed.

The invention makes it possible to wind fibers around long, prepared winding tubes, also referred to as preforms, that may be divided in a plurality of shorter modules later, after potting, at discrete selective sites in the region of the potting. Very advantageous production and processing are thus made possible. Losses at the axial ends of the winding resulting from reversing points and so on as they occur during winding no longer have the importance they had in manufacturing discrete modules and in directly producing discrete modules.

Preferably, the lower layer is laid down onto a tube that forms the imaginary cylinder of this layer. The winding thus has an improved mechanical stability. A particular advantage thereof is that this tube comprises radial passages that form the exit and access passages for the permeate flow, more specifically for the circulation air. This exit or access is preferably formed in proximity to an axial end of the module. The associated access or exit is then preferably located in proximity to the other axial end and preferably in the region of the outermost layer. The distance between neighbouring hollow fibers of one layer and the alternating sign of the wind angle from one layer to the other permits to achieve on the one side good axial penetration of the permeate flow and on the other side good axial flow of the permeate flow. Overall, one obtains a favourable flow path, more specifically counterflow circulation of the permeate volume flow with respect to the fluid flow path in the hollow fibers. Circulation around the outer surfaces of the hollow fibers is substantially equal and uniform.

In a preferred embodiment, the wind angle ranges between 15° and 75°, preferably between 20° and 70°, and more specifically is on the order of 45°. The wind angle is defined by the angle at which the hollow fiber is inclined to the module axis when being wound around the imaginary cylinder; Put another way, the wind angle is the angle of a tangent of a helically wound hollow fiber membrane with respect to the module axis. At an angle of 90°, winding would result in rings, at a wind angle of 0°, the hollow fibers would be oriented parallel to the module axis on the imaginary cylinder. The larger the wind angle, the longer the discrete fibers and the lower the number of fibers that can be accommodated in one layer. The same applies in reverse for small wind angles. At large wind angles, one is confronted with the problem of keeping the distance between the hollow fibers within a desired range because of the low number of hollow fibers in each layer. Advantageously, the distance between neighbouring hollow fibers ranges between 0.2 and 2 mm, more specifically from 0.3 to 1.2 mm. In this case, the hollow fibers typically have an outer diameter of about 0.6 mm and an inner diameter of about 0.3 mm. The hollow fibers are not limited by outer and inner diameter; the outer diameter may for example range from 0.1 to 5 mm.

In accordance with the invention, semi-permeable membranes e.g., hollow fiber composite membranes are utilized. Thanks to the winding technique, the inner cross sections are affected to the least possible extent over the length of the fibers. The points of touching contact between discrete hollow fibers are only located between neighbouring layers; the discrete hollow fibers of one layer are not in touching contact with one another. The points of touching contact occupy but a very small fraction of the entire outer surface of the hollow fiber membranes so that a very small portion of the overall outer surface only is not available for access of circulation gas.

In a preferred developed implementation, the outermost layer is covered by a shell that tightly surrounds said outermost layer and comprises access or exit means for the circulation gas; these means are preferably located in proximity to an axial end region of the module. It has been found that what is termed a shrinkable tube is preferred to be used as said shell. An oversized tube is pulled onto the finished module and heat shrunk in such a manner that it rests onto the uppermost layer with a tight but not compressive fit. The hollow fibers of the uppermost layer are not compressed. The shell prevents circulation gas from being short-circuited past the outermost layer and outside of the outermost layer. The tube onto which the innermost layer is wound has the same action with regard to a direct passage of circulation gas beneath the first layer that would be possible but for said tube.

Preferably, a plurality of hollow fibers, for example three, five fibers or more, is laid so that the fibers are parallel to one another, as actually known from U.S. Pat. No. 5,702,601 A. The total number n of fibers one layer is capable of accommodating cannot be exceeded.

BRIEF DESCRIPTION OF THE DRAWINGS

Other features and advantages of the invention will become more apparent upon reviewing the appended claims and the following non restrictive description of embodiments of the invention, given by way of example only with reference to the drawing. In said drawing:

FIG. 14: is a top view onto the arrangement of FIG. 13, FIG. 15: is a sectional view of a portion of a winding, said sectional view being approximately obtained following the section line XV-XV of FIG. 3, but at a wind angle of about 45°.

DETAILED DESCRIPTION

The hollow fiber module will be explained herein after by way of example for a hollow fiber drier module although the explanations given herein generally apply to any hollow fiber module.

The hollow fiber drier module has an inlet 20 for a gas to be dried and an outlet 22 for dried gas. Both are located at axial end regions. In these axial end regions, only the fiber interiors are freely accessible, the outer shells of the fibers are potted in a plastic material without the spaces between the hollow fibers being axially accessible. Corresponding plastic rings 24 are shown.

Circulation gas is radially supplied to the module; for this purpose, it has an access port 26, and a discharge port 28 for circulation gas. The module has a module axis 30. Finally, the module shown in FIG. 1 also has a winding core in the form of a tube 32 and an outer shell 34 in the form of a heat-shrinkable tube that is so short that there remains an uncovered region between the heat-shrinkable tube and the plastic ring 24 through which the discharge ports 28 are realized, see FIG. 1. The access port 26 is formed as follows: on the inner shell of the module, the tube 32 has a groove 27. Said groove is located in proximity to the associated plastic ring 24 on the outer side of the tube 32. Further, at least one axial bore 29 is formed from the end side of the tube 32 thereinto, with said axial bore 29 meeting the groove 27. A plurality of axial bores 29 can be provided. Their number and/or inside diameter is chosen so that the desired quantity of circulation air is allowed to pass. A regulatable valve can also be mounted upstream of the axial bore 29. Together with the groove 27, the at least one axial bore 29 forms the access port 26.

Figure 2:
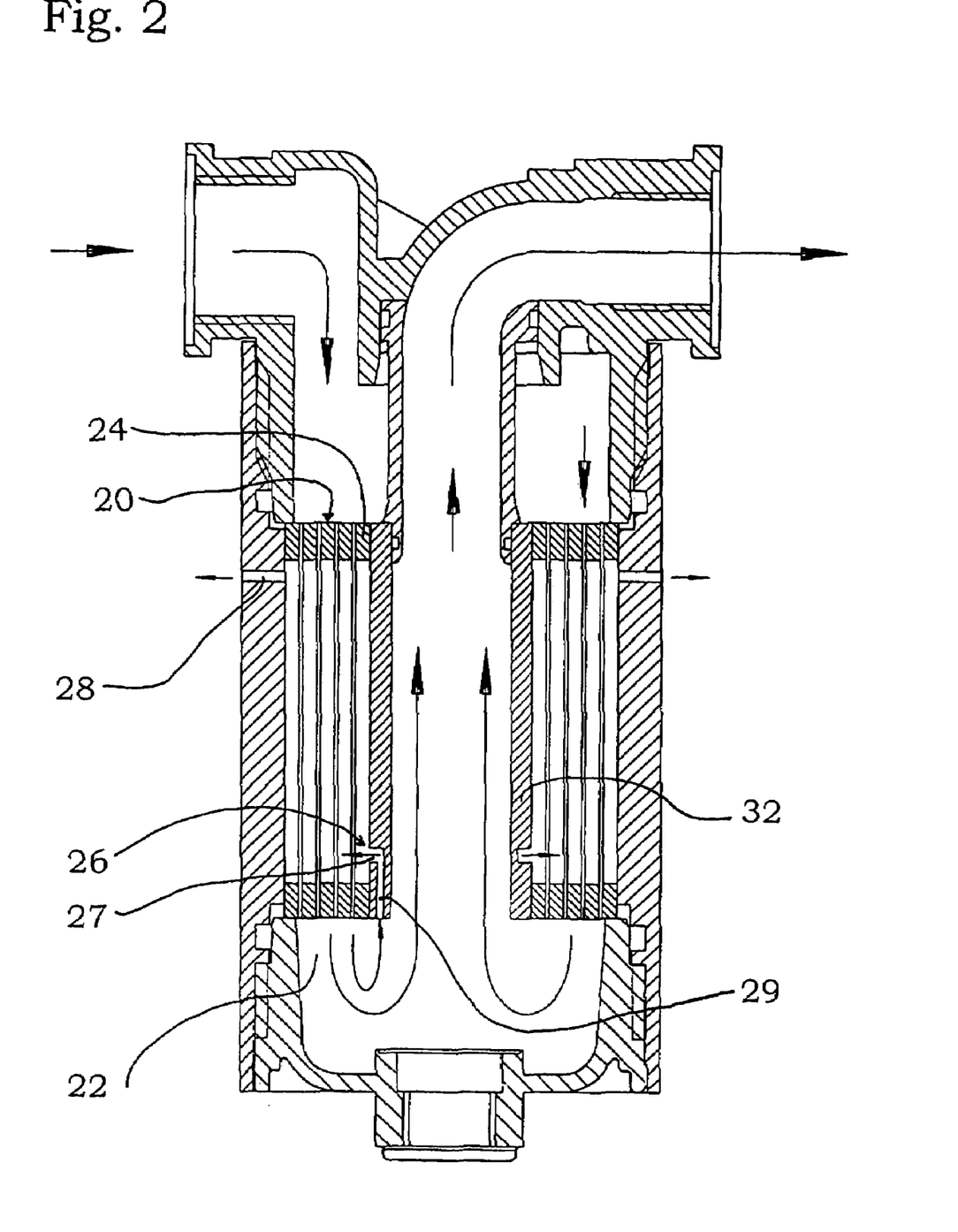
FIG. 2: is a sectional view of a complete filter having a module of the invention that is only shown schematically herein.

FIG. 2 shows the module mounted in a filter, but in a simplified view, with the hollow fibers passing therethrough in a straight line. The filter housing itself is known and needs not be discussed in detail herein; the reader is referred to the filter housing as disclosed in PCT/DE 01/02168 for example. As is evident from FIG. 2, the air enters the filter housing through an entrance (see arrows) and reaches the inlet 20 of the filter module. The air to be dried flows through the hollow fiber membranes that remove humidity from the air. At the outlet 22, it exits the module and flows inside the tube 32 to an exit port of the filter housing. Passages that are disposed in the region of an access port 26 are thereby provided in the tube 32. A fraction of the dried air flows through the passages in the direction counter to that of the air to be dried and exits in the region of the discharge port 28, see arrow.

Figure 3:
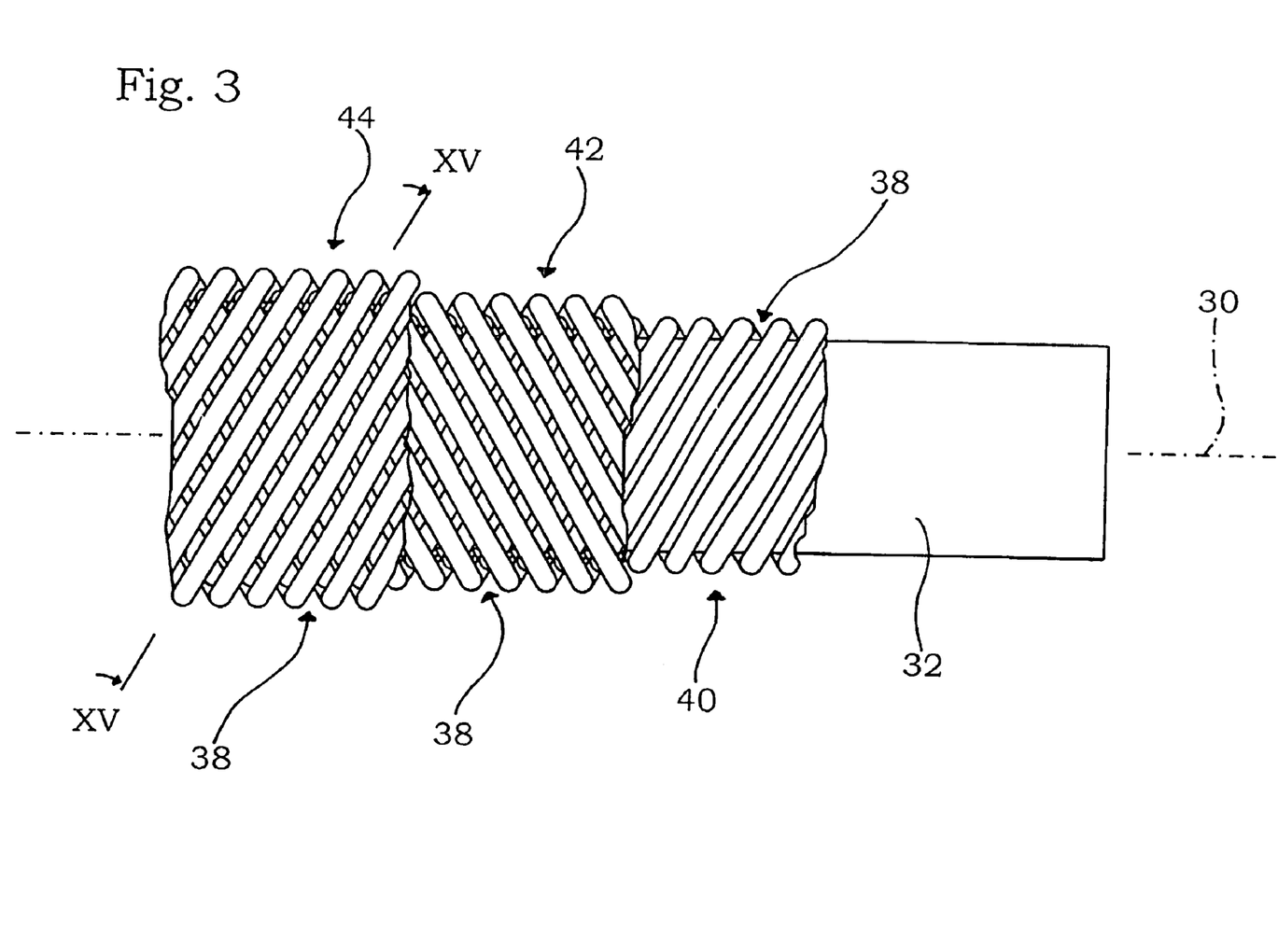
FIG. 3: is a side view of a drier module having a winding core and three layers, with a portion of the various layers cut away to better illustrate the build-up of the layers.

The special winding method will be discussed herein after. The objective of the winding method is to obtain a hollow cylindrical coil having multiple layers. FIG. 3 shows a three-layer winding on a tube 32. For better understanding of the build-up of the windings, portions of the discrete layers have been cut away in steps; the complete three-layer winding is only shown to the left in the FIG. It can be seen that the first layer 40 in the form of a multiple-start thread is formed by a number n1 of hollow fibers. The hollow fibers are arranged in a spaced-apart relationship, the distance is indicated at a (see FIG. 8). The distance a is the same for all the spaces between the fibers of one layer. In another layer, a may be different but is the same for all the spaces of this very layer.

Further, the number n of hollow fibers is different in each layer. Generally, the number increases with the number of layers, from the first to the second and so on. The fibers of one layer are not in touching contact with one another. They however are in touching contact with the fibers of a neighbouring layer that are laid crosswise with respect to those. In all the layers, the absolute value of the wind angle is constant. The wind angle .alpha. changes sign from one layer to the other. The first and the third layer 42 in FIG. 3 for example have the wind angle plus .alpha. whereas the second winding comprises the wind angle minus .alpha. Accordingly, the first layer 40, which is defined on the inner side by the cylindrical outer shell of the tube 32, has n1 hollow fibers with the clearance between said hollow fibers being a1 and the helix angle plus .alpha. The second layer 42 has n2 hollow fibers with the clearance a2 and the helix angle minus .alpha. In the third layer, n3 hollow fibers have a clearance a3 and a helix angle plus .alpha. This applies in equivalent fashion to higher layers. The second layer 42 is defined by an imaginary cylinder the diameter of which is larger by 2d than the diameter of the tube 32, with d being the outer diameter of the hollow fibers. For the third layer, the outer diameter of the imaginary cylinder is the diameter of the tube 32 plus 4d.

Figure 4:
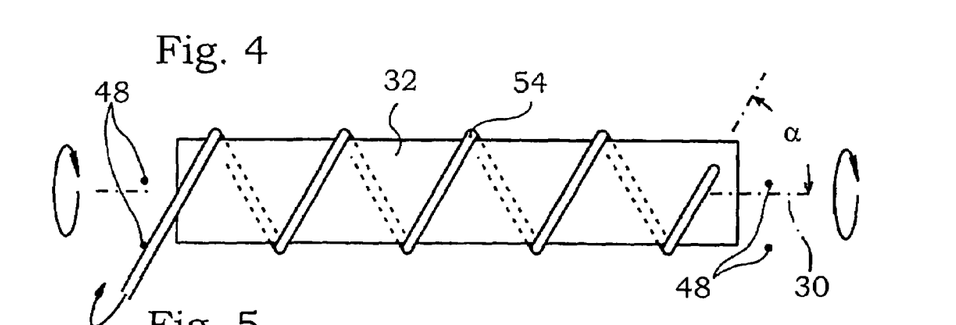
FIG. 4: is a schematic side view of a winding core onto which a first hollow fiber of a first layer is laid down to illustrate the winding process.

From FIG. 4 it can be seen that helically oriented channels 38 remain free between the discrete hollow fibers. They can also be seen for example on the second layer 42 together with the underlying, intersecting, overlapped helical channels 38 of the first layer 40. Accordingly, the helical channels 38 of neighbouring layers are communicating. In addition to the helical flow path within one layer, a more or less axial e.g., undulating flow takes place making use of the intersecting helical channels 38 of neighbouring layers.

Figure 5:
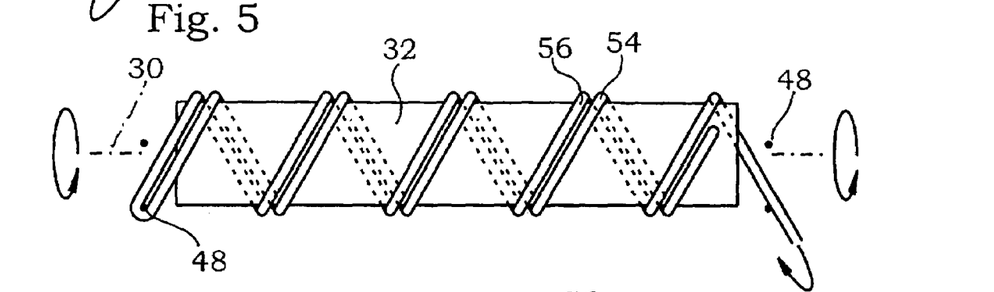
FIG. 5: is a view like FIG. 3, with a second hollow fiber being now laid down.
Figure 6:
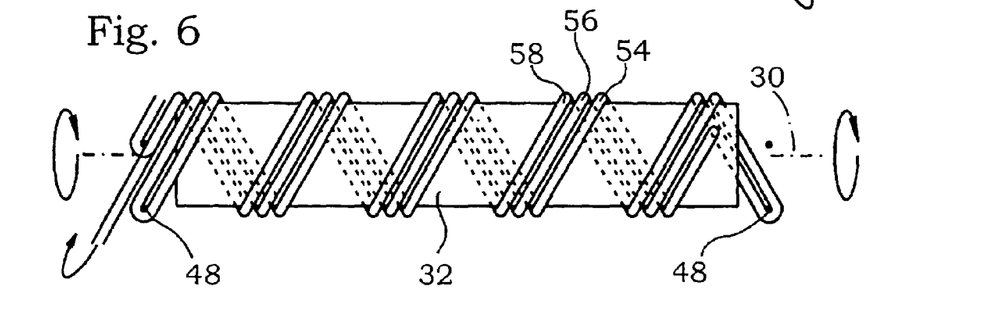
FIG. 6: is a view like FIG. 3 after the third hollow fiber has been wound.

The sequence of laying the hollow fibers onto a winding core in the form of a tube 32 is evident from the FIGS. 4-6. In a winding machine, which is actually known and needs not be illustrated herein, the tube 32 is clamped and rotated about its axis, meaning about the module axis 30, see rotation arrows. Simultaneously, an endless hollow fiber is supplied at the wind angle .alpha. and laid down; in this manner, a first hollow fiber 54 is laid onto the winding core, with the result thereof being shown in FIG. 4.

At the two axial ends of the winding core, there are provided pins 48 or similar holding devices that rotate together with the winding core. The endless hollow fiber is wound about one of these pins 48 and fixated before winding of the second hollow fiber 56 begins.

Figure 1:
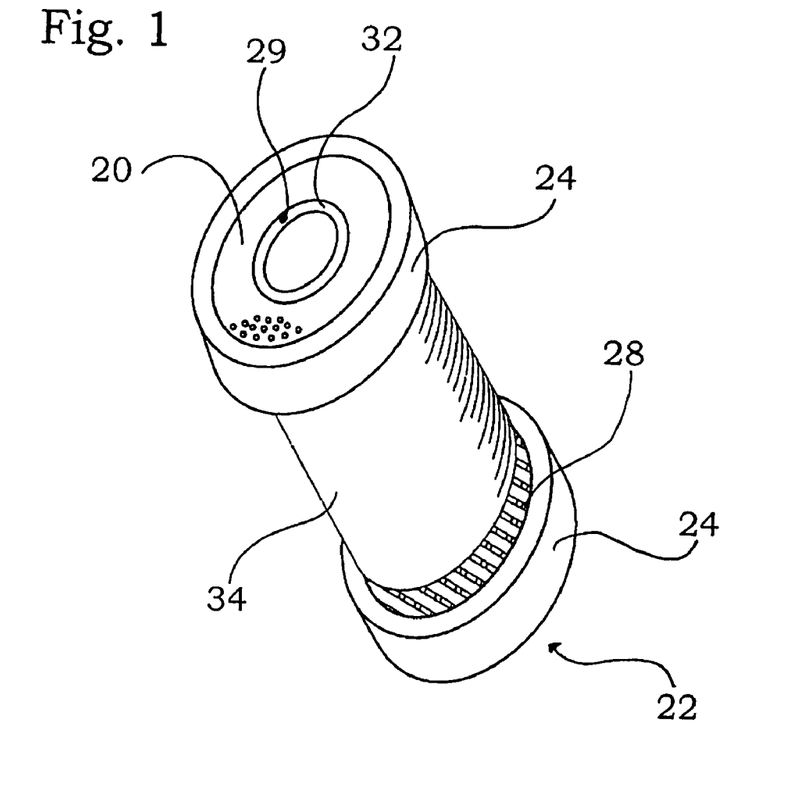
FIG. 1: is a perspective view of a drier module.

As becomes apparent from what has been said herein above, winding is carried out with an endless hollow fiber, although the module is described for the state in which the module is completed as shown in FIG. 1. In this state, one obtains a plurality of discrete hollow fibers by winding the one endless hollow fiber. This happens by cutting the excess regions of the hollow fibers at the axial ends of the winding core. It is not before this cutting has been performed that the interior of the discrete hollow fibers becomes accessible at the axial ends, meaning that the inlet 20 and outlet 22 are formed. This will be discussed in greater detail herein after.

FIG. 5 shows how the second hollow fiber 56 of the first layer 40 is laid down; for this purpose, the direction of rotation of the winding machine is changed, the second hollow fiber 56 is laid down beside the already laid down first hollow fiber 54 in the clearance position a therefrom.

To lay down the third hollow fiber 58, see FIG. 6, the fiber is again first laid down so as to form a grip around a fixed point, more specifically a pin 48, but this time at the other axial end. Next, the third hollow fiber 58 is laid down. This procedure is repeated until the first layer 40 is completely filled. Then, the second layer 42 is laid down. With each layer that is laid down, the winding gains in stability. The winding more specifically gains mechanical strength by the plastic rings 24 mounted to its axial ends.

Figure 7:
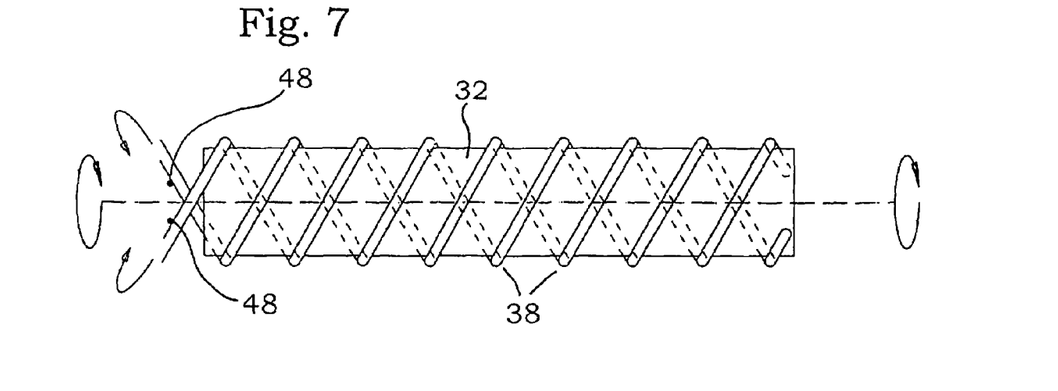
FIG. 7: is a view like FIG. 3, with two hollow fibers being concurrently wound in one working step.

It is possible to concurrently wind two endless hollow fibers, as shown in FIG. 7. It is also possible to simultaneously supply further hollow fibers in parallel. In the illustration as shown in FIG. 7, two discrete, endless hollow fibers are supplied to the winding core from two different sides, that is, that are offset by 180°, in order to accommodate the radial components of the tensile strains of the two endless hollow fibers and, accordingly, for the winding core to be prevented from bending with respect to its axis.

Figure 8:
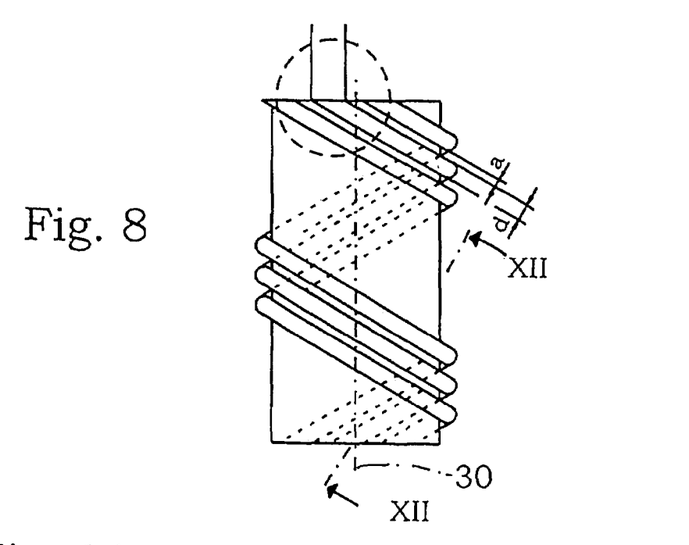
FIG. 8: shows a portion of FIG. 6, meaning an intermediate state in the process of producing the entire winding.
Figure 9:
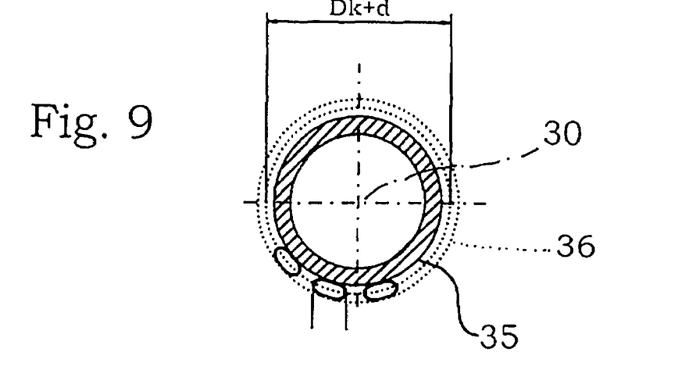
FIG. 9: is a sectional front view of the intermediate state of FIG. 8, FIG. 10: is a sectional view like FIG. 9, with the first layer having been completed and with hollow fibers of a second and of a third layer.

Hereinafter, the distribution of the discrete hollow fibers of one layer within said layer will be discussed. In FIG. 8, which substantially corresponds to FIG. 6, the clearance a between neighbouring hollow fibers and the outer diameter d of the hollow fibers is shown. FIG. 9 illustrates how the three hollow fibers are arranged about the circumference of the winding core, which is here formed by a tube 32. The tube 32 thereby has the outer diameter Dk. The length of the circumferences accordingly is $\pi \cdot Dk$; n1 hollow fibers have to be accommodated along this length, with the hollow fibers being laid down at the wind angle .alpha. In the sectioning plane of FIG. 9 and also at the axial ends, meaning in the region of the outlet 22 and of the inlet 20, the hollow fibers appear to be ellipses because of the wind angle. In FIG. 9, there is indicated the distance 1 by which a hollow fiber 58 has to be displaced in the radial plane in the circumferential direction in order to reach the site of the neighbouring hollow fiber. In the first layer considered herein, a total of n1 hollow fibers are in a clearance relationship a1 with each other. Accordingly, the following equation is obtained:

$$n1 \cdot (a1+d) = Dk \cdot \pi \cdot \cos \alpha \qquad (1).$$

In a second layer, which receives n2 hollow fibers, the clearance between neighbouring hollow fibers is a2. The imaginary cylinder of this second layer has the diameter Dk+2d. The following relation is obtained:

$$n2 \cdot (a2+d) = (Dk+2d)\pi \cdot \cos \alpha \qquad (2).$$

The same applies in equivalent fashion to the other windings. The clearance a between neighbouring hollow fibers should be, as far as practicable, the same for the discrete windings, and should preferably vary by less than 30%, more specifically by less than 20% and preferably by less than 10% from one layer to the other. It is possible to work with the same constant clearance a for all of the layers if the following relationship is respected:

$$n2-n1 = 2d \, \pi \cos \alpha : (a+d) \qquad (3).$$

This equation (3) has been obtained by substituting a for a1 and a2 respectively in the equations (1) and (2) and by subtracting equation (2) from equation (1). As a matter of course, n1, n2 and so on are natural numbers so that the difference obtained by subtracting the number of hollow fibers in the second layer from the number of hollow fibers in the first layer will also be a natural number, for example 1 or 2. By selecting the wind angle .alpha., the clearance a and the outer diameter d of the hollow fibers, one obtains a winding in which the clearance a is the same in all of the layers.

It appears from the equations (1) through (3) indicated herein above that, if n, meaning the number of hollow fibers in one layer, and D, meaning the diameter of the imaginary cylinder of the layer, are high enough, the constructor is still free to determine suited clearances a.

FIG. 9 shows the arrangement of the only three hollow fibers of FIG. 8 on the tube, said tube forming with its outer shell the imaginary cylinder 35 of the first layer. A dotted line with a diameter Dk+d is also shown in FIG. 9, the centerpoint of the various hollow fibers lying on said line. Further, an imaginary cylinder 36 that forms the end of the first layer and defines the wind diameter for the second layer that has not been illustrated herein is also shown.

Figure 10:
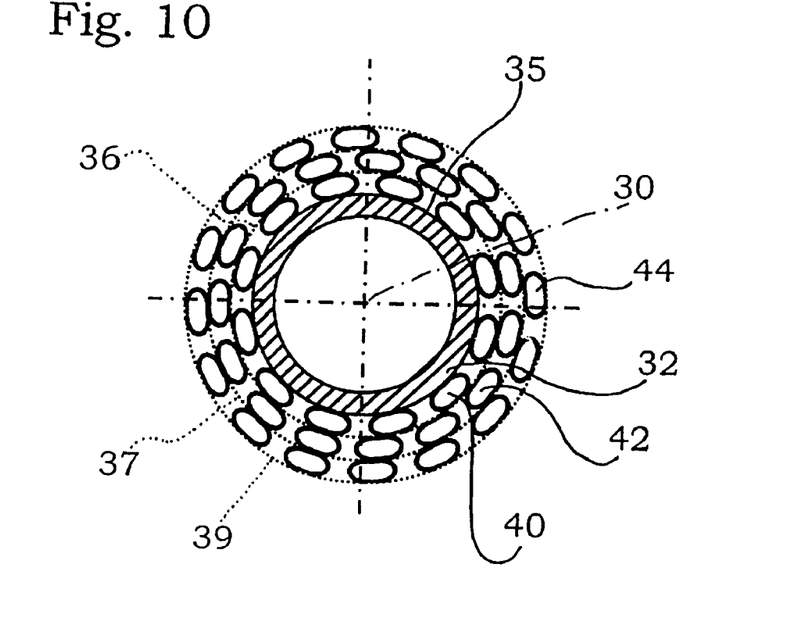
Figure 11:
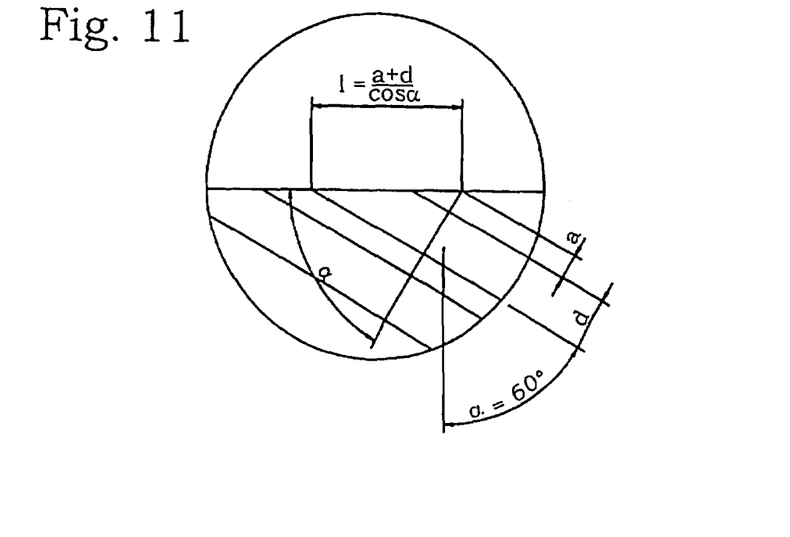
FIG. 11: shows the encircled portion of FIG. 8 to an enlarged scale.

These dispositions are illustrated in still closer detail in FIG. 10 which is a sectional view of a module having three layers 40, 42, 44. All the layers are fully occupied by hollow fibers. The second layer 42 is located directly on top of the first layer 40 and is bounded on its inner side by the imaginary cylinder 36 of the second layer. Likewise, the third layer 44 is bounded on its inner side by the cylinder 37. An additional cylinder 39 is shown, which bounds a possibly provided fourth layer on the inner side thereof. If no fourth layer were provided, the orientation of 39 would indicate the orientation of an outer shell 34 in the ideal case, that is, with no well in the region of the helical channels 38.

Figure 12:
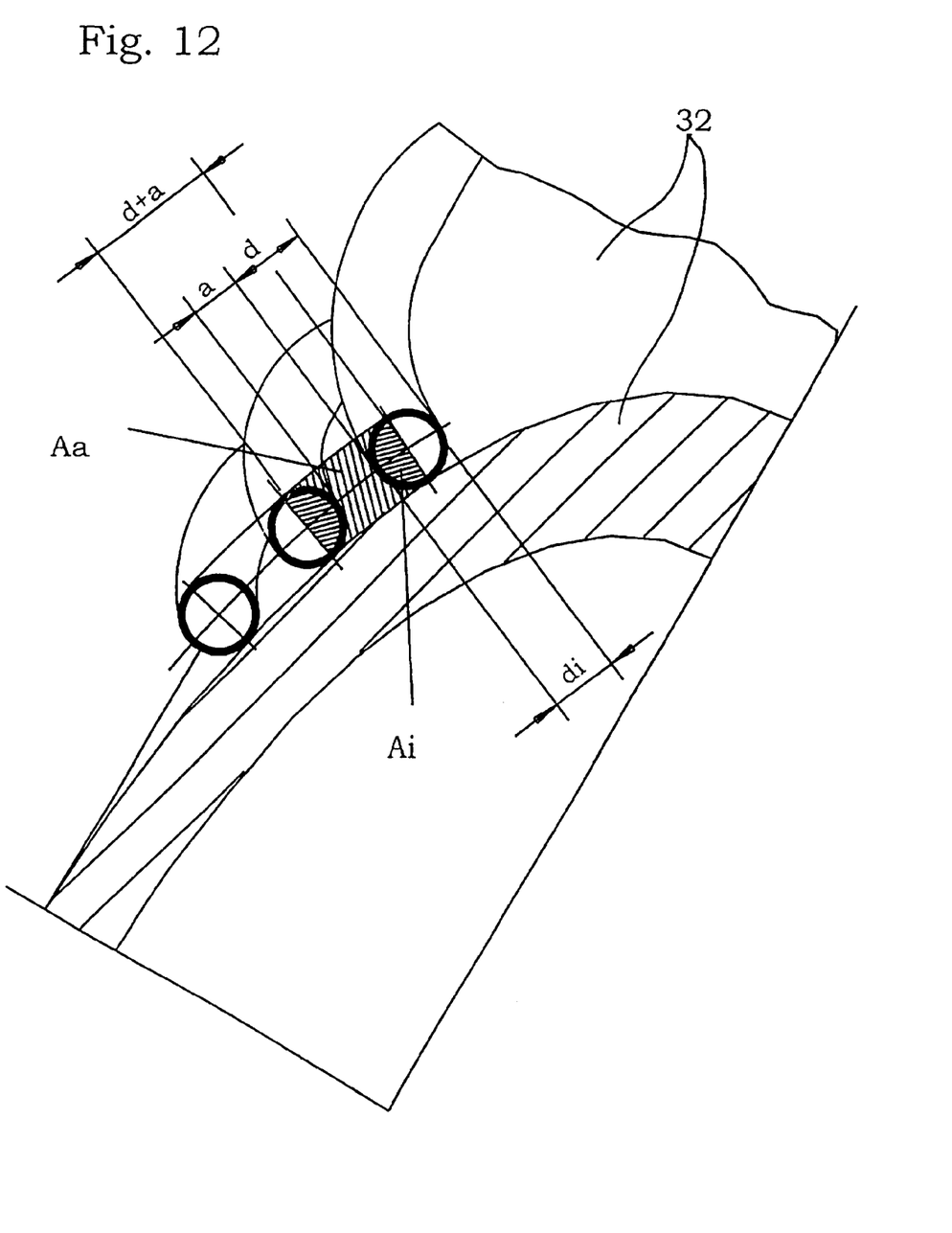
FIG. 12: is a sectional view taken along section line XII-XII of FIG. 8, FIG. 13: is a front view of a module during manufacturing and of a portion of a winding device to illustrate the winding process.

Moreover, in accordance with the invention, the cross section available for the flow path of the gas to be dried and for the flow path of the circulation gas may also be adapted and adjusted with respect to each other. This is explained with reference to FIG. 12. As shown in FIG. 12, one has, for every single hollow fiber, an overall inner surface Ai that is determined by the square of the inner radius times $\pi$ and an overall outer surface Aa that is determined by the surface of the rectangle $(d+a)\cdot d$ minus the entire cross section of a hollow fiber, i.e., $(d/2)^2 \cdot \pi$. A judicious selection of a in particular, but also of the other parameters, permits to selectively obtain the desired relationship between the inner flow path and the outer flow path. The velocity of the flows is also to be taken into consideration. A ratio of the inside flow velocity to the outside flow velocity ranging from 1-5 is of practical importance depending on the desired degree of drying or on the desired reduction in the dew point. The respective volume flows are obtained by multiplying the products of the flow velocity with the available cross-sectional area. Usually, one works with a circulating air volume flow on the order of some percents of the volume flow of air to be dried, for example about 12% thereof. The above considerations permit to calculate a suited cross section ratio of Aa to Ai and then, to set a, d and the wind angle .alpha. as well as, in addition thereto, D, by means of the parameters.

Upon completion of the winding consisting of the discrete layers 40, 42, and so on, said winding is stabilized by plastic rings 24 applied to their ends, with this latter step being performed according to prior art. A particularly advantageous fact for introducing plastic material into the spaces between the hollow fibers is that radial permeability exists, that said permeability is a known variable and that; in addition thereto, it is homogeneous.

Referring to the FIGS. 13-15, details regarding the manufacturing process, meaning more specifically the winding of a fiber, will be discussed herein after.

Figure 13:
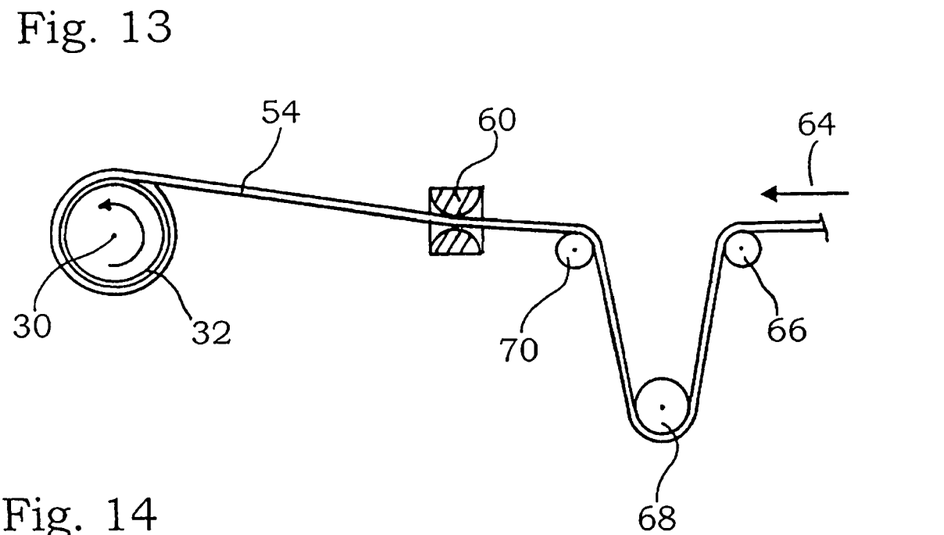
Figure 14:
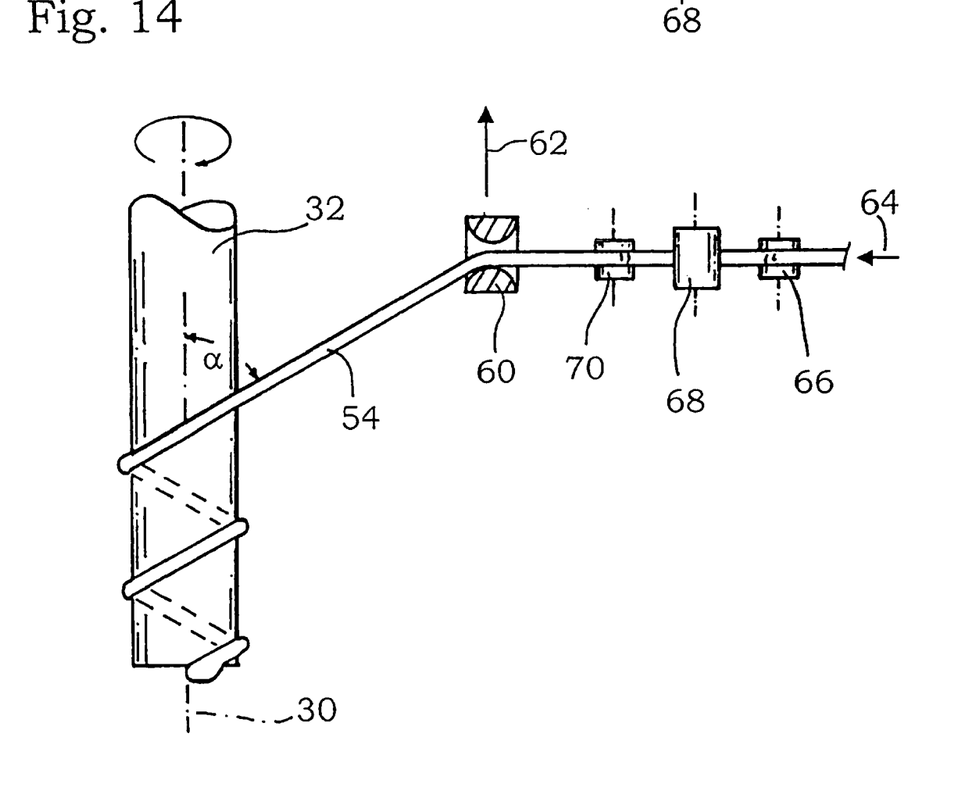

The FIGS. 13 and 14 show how a hollow fiber 54 is laid down onto the cylinder 35 or the tube 32 of the first layer 40, what will be said applying also to the laying down of the other layers 42, 44, and so on. In a winding machine that is shown only schematically herein, the tube 32 is rotated about the module axis 30 in the direction of the arrow. The hollow fiber 54 extends tangentially and at a wind angle .alpha. towards the tube 32. It passes through an orifice 60 in the fiber that provides for precision guiding and, as a result thereof, accurate positioning of the hollow fiber 54 in both directions in space. The orifice 60 in the fiber is moved in the direction of the module axis 30 relative to the tube 32 or of the already built-up portion of the winding., The movement occurs pursuant to arrow 62 at the velocity resulting from the geometry chosen for the winding, more specifically from the wind angle .alpha. and the diameter of the tube 32.

The hollow fiber 54 is supplied from a stock that has not been illustrated herein to the orifice 60 of the fiber. This is symbolized by the arrow 64. Before the hollow fiber 54 reaches the orifice 60 of the fiber, it is conducted over a first deflector roll 66 where it is deviated downward toward a dancer roll 68 and from there upward to a second deflector roll 70 that more specifically is built according to the same design principle as the first deflector roll and is disposed approximately on the same vertical height as the latter.

The dancer roll 68 has a given weight. As a result, in the feed portion and in the discharge portion of the hollow fiber, there prevails a mechanical tensile force in the hollow fiber on the left and on the right side of the dancer roll 68 in FIG. 13.

Further, the dancer roll 68 further accommodates in a known manner fluctuations in the hollow fiber supply from the stock. It ensures that the tension in the fiber remains constant.

Typically, the dancer roll has a weight ranging between 10 and 200 g, for example of 100 g. As a result, the tension in the thread between dancer roll 68 and tube 32 is about 50 g.

The mechanical strain in the hollow fiber 54 causes the hollow fiber to slightly stretch, said stretch serving to wind the hollow fiber 54 onto the tube 32. As a result, the hollow fiber 54 rests on the tube 32 or, in the second layer 42, on the fibers of the first layer 40 and in the third layer 44 on the fibers of the second layer 42 and so on, with a frictional fit.

A strong winding is achieved thanks to the strain, respectively the stretch. The discrete hollow fibers 54, 56, 58 can only be displaced in the direction of the module axis 30, that is, be pushed out of the ideal helical line on which they were laid during winding by exerting a certain force. As a result of the stretch, conscious or inadvertent deflection of a fiber causes the latter to return to its initial state when the deflecting force is eliminated.

The strain in the hollow fibers is to be selected such that a strong winding is achieved. As can be seen, the wind angles are in a range such that each fiber is wound at least once between inlet 20 and outlet 22, meaning is wrapped at least 360° around the tube 32. Under these circumstances, sufficient frictional hold of the discrete fibers on the tube 20 or on the underlying layer is important in achieving a strong winding. A deformation also occurs.

But the strain in the discrete hollow fibers is not allowed to become so high as to cause the hollow fibers to noticeably vary their cross-sectional shape. The weight of the dancer roll 68 is chosen in accordance with the physical properties of the fiber 54 to cause the hollow fibers to deform within tolerable limits.

Figure 15:
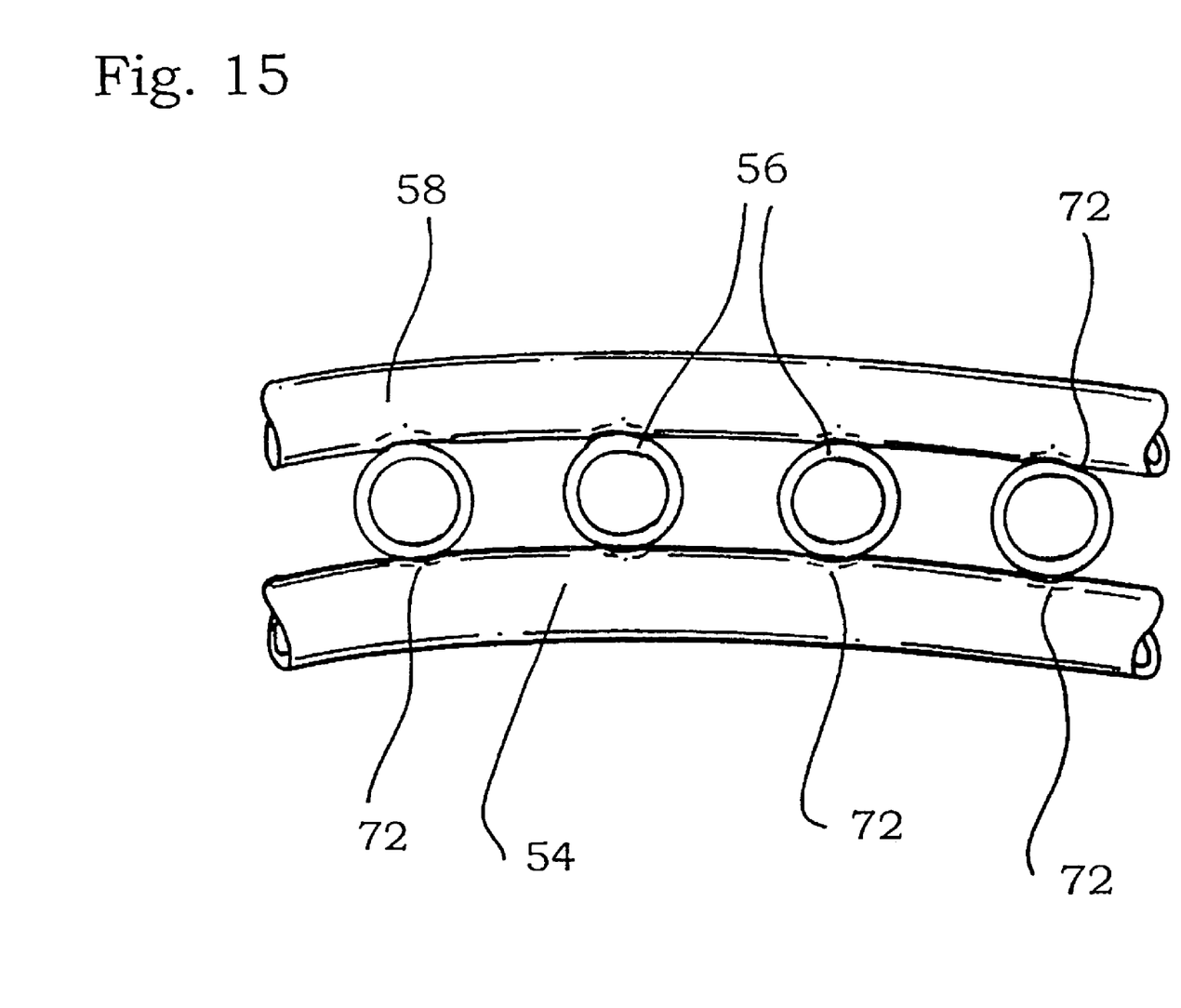

FIG. 15 shows small details of three consecutive layers 40, 42 and 44. The wind angle is 45° so that the hollow fibers 54, 56 and 58 intersect at an angle of 90°. It appears that the hollow fibers 56 of the second layer 42 slightly deform at the points of touching contact with the hollow fibers 54 of the first layer 40 and with the hollow fibers 58 of the third layer 44, with the deformation regions being labelled at 72. In the deformation regions 72, the cross-sectional shape differs from the ideal circular shape.

On the one side, deformation is necessary to achieve a strong winding, on the other side however it is disadvantageous because it results in some places having a slightly smaller free cross-section than those located outside of the deformation regions. The deformation regions 72 are selected to be just large enough to allow positioning of the hollow fibers with respect to one another while keeping the variation in cross-section low, more specifically below 10%, preferably below 5% and more specifically below 2%.

A particularly advantageous embodiment of the invention will now be discussed with reference to FIG. 16. Instead of laying down on a winding core 32 a winding for one single module, one relatively long winding the axial length of which is sufficient for a plurality of discrete modules is produced. Whilst the discrete modules have a length of for example 10-40 cm, it is readily possible to produce quite long windings, of for example 4 m long. These windings are implemented in exactly the same manner as described herein above for a winding of one single module. The completed preform 50 is potted at desired intervals with a sealing compound or encapsulated with plastic rings 24, as illustrated in FIG. 12. The plastic rings 24 are sectioned in their central region, see sectioning plane 52, with inlet 20 and outlet 22 being formed at the same time so as to obtain the discrete modules. It is also possible to use mechanical clamps or the like instead of the plastic rings 24.

Figure 16:
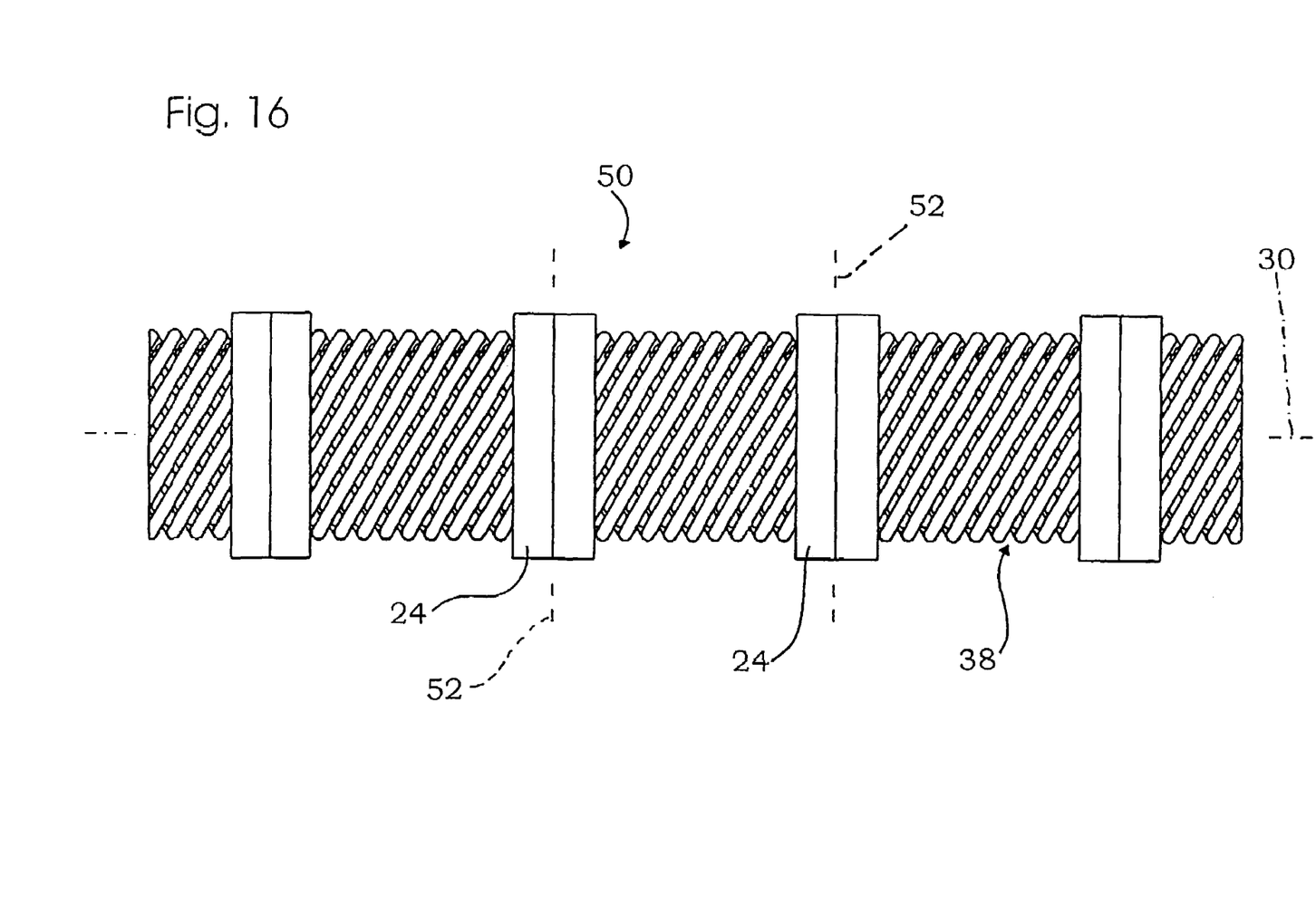
FIG. 16: is a side view of a portion of a preform for a plurality of modules.

In the implementation as shown in FIG. 16, the way of producing the winding is of no concern. Meaning, any winding will do. It needs not be implemented as set forth in patent claim 1. Any shape in arranging the hollow fibers will do to first produce, in accordance with the proposal, a quite long preform 50 that will later be divided into discrete module parts. The plastic rings are obtained by injecting a plastic material or any other suited material.

The invention claimed is:

1. A hollow fiber fluid separation module comprising:
an inlet for an inlet feed flow, an outlet for an exit flow;
an access port for a permeate flow, a discharge port for the permeate flow;
a module axis and a plurality of hollow fibers;
each of the hollow fibers extending from the inlet to the outlet and comprising an interior communicating with the inlet at one end of each hollow fiber and with the outlet at the other end of each hollow fiber, with the hollow fibers wound in multiple layers to form a hollow cylindrical coil;
each layer being defined on its inner side by an imaginary cylinder and having a number of hollow fibers helically wound on the cylinder with a helix angle $\alpha$;
the hollow fibers being in a clearance relationship with each other and equally spaced on the cylinder, with one layer differing from a neighboring layer by the fact that all the fibers of the one layer are inclined at the wind angle plus $\alpha$ whereas all the fibers of the neighboring layer are at the wind angle minus $\alpha$; and
each hollow fiber disposed at least once around the circumference of the cylinder and having a tensile strain of at least 10 g to frictionally maintain the fibers around the cylinder and sufficiently hold the fibers against the crosswise disposed fibers lying underneath without noticeably restricting the respective inner cross sections of the fibers even though the fibers are deformed at the respective intersections.

2. The hollow fiber fluid separation module as set forth in claim 1, wherein the first, lowermost layer is located on a tube that forms the imaginary cylinder of the layer.

3. The hollow fiber fluid separation module as set forth in claim 1, wherein the access port comprises at least one axial bore that is formed in the tube.

4. The hollow fiber fluid separation module as set forth in claim 1, wherein the wind angle $\alpha$ ranges between about 15° and about 75°.

5. The hollow fiber fluid separation module as set forth in claim 1, wherein the distance (a) between two hollow fibers of one layer ranges between onefold and tenfold the inner radius of the hollow fibers.

6. The hollow fiber fluid separation module as set forth in claim 1, wherein all of the fibers have the same length.

7. The hollow fiber fluid separation module as set forth in claim 1, wherein all of the fibers are built according to the same design principle.

8. The hollow fiber fluid separation module as set forth in claim 1, wherein the tensile strain is selected such that the free inner cross section of the hollow fiber at the intersections is more than 90% of the inner cross section of the hollow fiber outside of the intersections.

9. The hollow fiber fluid separation module as set forth in claim 1, wherein the outermost layer of the winding is enclosed by a shell that tightly surrounds the outermost layer and comprises access or exit means for permeate flow.

10. The hollow fiber fluid separation module as set forth in claim 1, wherein the module is obtained from a preform by cutting the preform along the sectioning planes and that the preform comprises an axially quite long winding and has an axial length that is greater than the length of a plurality of modules.

11. The hollow fiber fluid separation module as set forth in claim 8, wherein the tensile strain is selected such that the free inner cross section of the hollow fiber at the intersections is more than 95% of the inner cross section of the hollow fiber outside of the intersections.

12. The hollow fiber fluid separation module as set forth in claim 11, wherein the tensile strain is selected such that the free inner cross section of the hollow fiber at the intersections is more than 98% of the inner cross section of the hollow fiber outside of the intersections.

13. The hollow fiber fluid separation module as set forth in claim 9, wherein the outermost layer of the winding is enclosed by a shell that tightly surrounds the outermost layer and comprises access or exit means for circulation gas.

14. The hollow fiber fluid separation module as set forth in claim 4, wherein the wind angle $\alpha$ ranges between about 20° and about 70°.

15. The hollow fiber fluid separation module as set forth in claim 14, wherein the wind angle $\alpha$ is about 45°.

16. The hollow fiber fluid separation module as set forth in claim 9, further comprising at least one of (i) at least one ring and (ii) at least one mechanical clamp, disposed over the windings along the coil to further stabilize the windings.

* * * * *